United States Patent
Sun et al.

(10) Patent No.: US 11,383,206 B2
(45) Date of Patent: Jul. 12, 2022

(54) WATER TREATMENT MEMBRANE AND METHOD OF MAKING WATER TREATMENT MEMBRANES

(71) Applicant: NL Chemical Technology, Inc, Mount Prospect, IL (US)

(72) Inventors: Patricia B. Sun, Palatine, IL (US); Jane C. Li, Arlington Heights, IL (US); Lars Kohler, Aurora, IL (US)

(*) Notice: Subject to any disclaimer, the term of this patent is extended or adjusted under 35 U.S.C. 154(b) by 152 days.

(21) Appl. No.: 16/939,626

(22) Filed: Jul. 27, 2020

(65) Prior Publication Data
US 2021/0031147 A1    Feb. 4, 2021

Related U.S. Application Data
(60) Provisional application No. 62/880,457, filed on Jul. 30, 2019.

(51) Int. Cl.
| | |
|---|---|
| *B01D 67/00* | (2006.01) |
| *B01D 71/56* | (2006.01) |
| *C01B 32/198* | (2017.01) |
| *B01D 61/02* | (2006.01) |
| *C02F 1/44* | (2006.01) |
| *B01D 69/10* | (2006.01) |
| *B01D 69/12* | (2006.01) |

(52) U.S. Cl.
CPC ....... *B01D 67/0088* (2013.01); *B01D 61/025* (2013.01); *B01D 61/027* (2013.01); *B01D 67/0006* (2013.01); *B01D 69/10* (2013.01); *B01D 69/12* (2013.01); *B01D 71/56* (2013.01); *C01B 32/198* (2017.08); *C02F 1/441* (2013.01); *C02F 1/442* (2013.01)

(58) Field of Classification Search
CPC .............. B01D 67/0088; B01D 61/025; B01D 61/027; B01D 67/0006; B01D 69/10; B01D 69/12; B01D 71/56; B01D 2325/20; B01D 67/0093; B01D 69/125; C01B 32/198; C02F 1/441; C02F 1/442
See application file for complete search history.

(56) References Cited

U.S. PATENT DOCUMENTS

| | | | | |
|---|---|---|---|---|
| 2015/0352500 | A1* | 12/2015 | Kim .................... | B01D 65/108 427/140 |
| 2015/0375180 | A1* | 12/2015 | Rybtchinski .......... | C07C 209/86 210/500.33 |
| 2018/0207591 | A1* | 7/2018 | Yu ....................... | B01D 67/0006 |
| 2019/0366722 | A1* | 12/2019 | Yu ............................ | B41M 1/30 |
| 2021/0060498 | A1* | 3/2021 | Gai ...................... | B01D 69/125 |

* cited by examiner

*Primary Examiner* — Krishnan S Menon

(57) ABSTRACT

A water treatment membrane and method of making water treatment membranes includes an interfacially formed polyamide layer residing upon a microporous support film and having a plurality of graphene oxide quantum dots attached to an outer surface of the polyamide layer. The polyamide layer has a permeate flux and a salt rejection performance. The permeate flux is increased by the presence of the graphene oxide quantum dots attached to the outer surface of the polyamide.

4 Claims, 1 Drawing Sheet

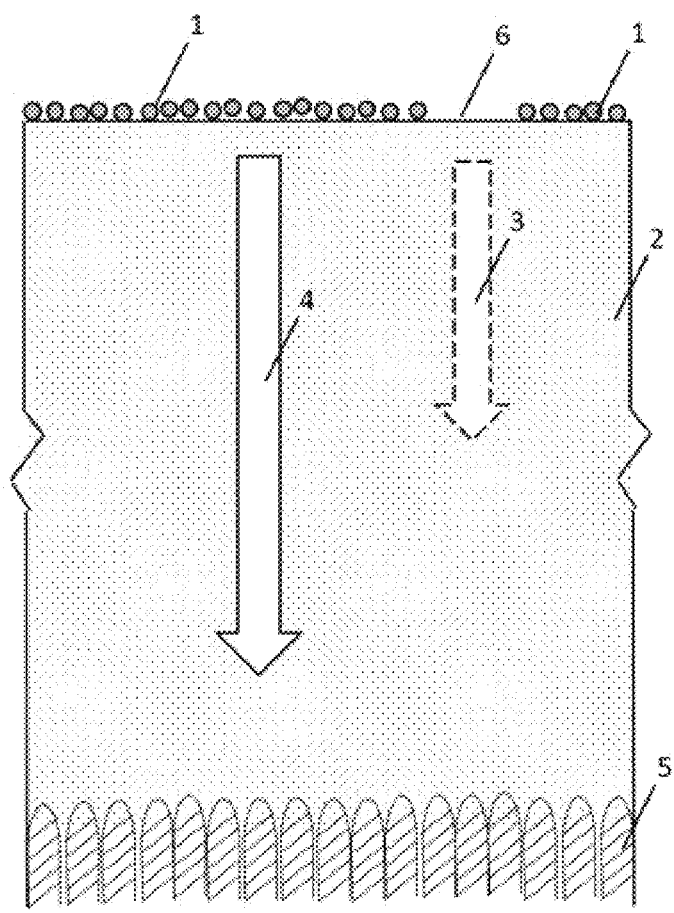

WATER TREATMENT MEMBRANE AND METHOD OF MAKING WATER TREATMENT MEMBRANES

CROSS-REFERENCE TO RELATED APPLICATIONS

I hereby claim the benefit under 35 U.S.C. Section 119(e) of U.S. Provisional Application 62/880,457 filed on Jul. 30, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure herein relates to water treatment membrane devices and more particularly pertains to a new water treatment membrane device for use in waste water treatment methods.

(2) Description of Related Art Including Information Disclosed Under 37 CFR 1.97 and 1.98

Global water scarcity and more rigorous environmental regulations have driven the research community to explore advanced methods for wastewater treatment, recycling and regeneration that are more sustainable, green and energy efficient. In this respect, novel membranes that have reliable long-term performances and require less operating energy along with low maintenance would be highly appealing to customers.

Among novel materials and technologies that have been investigated for membrane performance and lifespan enhancement, nanocomposite membranes prepared by incorporating nanomaterials in polymeric membranes have attracted considerable attention in recent years by scientists and researchers. The discovery of graphene nanosheet, which won the 2010 Nobel Prize for Physics, has opened an exciting new field in science and technology of nanomaterials with continuously growing academic and technological impetus. But regarding membranes, perfect graphene is impermeable. To make nanocarbon-based membranes permeable to water and impermeable to ions and particulates, nano-sized pores must be crafted in graphene monolayers. Pores can be generated in graphene sheets by particle bombardment, followed by chemical etching, but this involves high cost and technical difficulty. Alternatively, to make graphitic nanosheet-based membranes permeable to water and impermeable to ions and particulates, water pathways must be created by introducing artificial interlayer water channels in multilayer nanosheets made of graphene derivatives such as graphitic oxide (GO) and reduced graphitic oxide. Both approaches face severe challenges for scaling up to practical membrane usage requirements. A typical reverse osmosis membrane installation for generating municipal water can require thousands of square meters of water treatment membranes, for example.

In addition to the technical challenges, graphene based nanosheets have been noted to display cytotoxicity and to persist in the environment. Animal experiments have already shown that lung damage can occur after inhalation of graphene nanoparticles. And graphene oxide (GO) nanosheets have exhibited size-dependent toxicity; large-sized GO was more toxic than small-sized GO.

Graphene oxide quantum dots are an emerging class of zero-dimensional carbon nanomaterials (generally <10 nanometers) containing considerable amounts of hydroxyl, carboxyl, carbonyl and/or epoxide groups. They were first noticed and characterized in 2004 during purification of single-walled carbon nanotubes. Since then, researchers have developed many facile and low-cost routes to synthesize graphene oxide carbon dots with desired size, structure, and functionalities. The synthesis approaches can be classified into two categories, namely "top-down" and "bottom-up". Via the latter method, these nanocarbon leaflets can be produced from inexpensive molecular precursors such as citrates and carbohydrates through various thermal processes. Owing to their extremely small sizes, good biocompatibility, environmental friendliness, tunable hydrophilicity and ionic charges with large edge effects, excellent dispersity in water, and antifouling characteristics, they have great potential for fabrication of multi-functional composite materials and are highly desirable for membrane modification for water treatment applications. Their lower cytotoxicity has been proven by long-term in vivo and in vitro studies. Furthermore, the rich availability of functional groups attached to graphitic-oxide-based quantum dots provide many possibilities for chemistry modification and for incorporation into or onto water treatment membranes. Besides oxygen-containing functional groups, these can also be modified to contain anchoring groups based on amines and thiols, to name just two of the many possible choices.

Modification of polyamide-based salt-rejecting water treatment membranes has been explored wherein graphene oxide quantum dots were embedded in the polyamide matrix of the membranes Bi et al., "Thin film nanocomposite membranes incorporated with graphene quantum dots for high flux and antifouling property", J. Membrane Science, vol 553, pp. 17-24, 2018, reported on incorporating graphene oxide quantum dots into nanofiltration membranes and observing major increases in membrane flux. The graphene oxide quantum dots were hypothesized to form nanoscale multi-layered water channels at the interface between the quantum dots and the polyamide layer. In this study the quantum dots were embedded in the polyamide discriminating layer and the facilitated water flux was through the polyamide layer. A similar study was published earlier by Fathizadeh et al., "Polyamide/nitrogen-doped graphene oxide quantum dots (N-GOQD) thin film nanocomposite reverse osmosis membranes for high flux desalination", Desalination 2017. This study utilized amine-substituted graphene oxide quantum dots, which were fixed within the polyamide discriminating layer by co-polymerization during membrane formation. Major flux increases were also observed but at significant losses in salt rejection at high loadings of the graphene oxide quantum dots.

It is an object of this invention to provide reverse osmosis membranes characterized by improved water flux and maintained salt rejections by modifying the surfaces of these membranes with graphene nanomaterials in such a manner as to maintain salt rejection characteristics.

BRIEF SUMMARY OF THE INVENTION

Thin film composite water treatment membranes with improved performance characteristics are made by attaching functionalized graphene oxide quantum dots to the faces of these membranes, that is, to the top surfaces of the solute discriminating layers that would contact a water source to be treated. In particular, polyamide-based reverse osmosis and nanofiltration membranes with outer surfaces modified with attached graphene oxide quantum dots exhibit remarkably increased water permeation rates (fluxes) with little effect on salt rejection characteristics. These attached graphene oxide quantum dots also appear to mildly enhance biofouling resistance by the modified membranes. By way of example, nanofiltration membranes made by interfacial reaction of piperazine with trimesoyl chloride (a trifunctional acyl halide), which membranes are modified in accordance with the invention described herein, can exhibit increases in water flux of up to 50% or more. Such increases in membrane flux are instrumental in lowering feed water pressures in water treatment apparatus, resulting in very favorable savings in pumping and energy requirements.

Synthesis of graphene oxide quantum dots is covered herein, and a preferred type of graphene oxide quantum dots for membrane surface attachment is conveniently made by thermolysis of ammoniated citrate. By essentially carbonizing aqueous ammoniated citrate in an autoclave, one can produce amine-substituted graphene oxide quantum dots that may be advantageously attached to polyamide membranes by amide linkages. Other methods of affixing the graphene oxide quantum dots to membrane surfaces may be utilized, such as treatment with peroxides or by chemical reaction with crosslinking reagents. Fixation of the graphene oxide quantum dots is preferably permanent in nature, since the attached graphene oxide quantum dots ideally remain in place during water flushing and membrane cleaning cycles that are used in normal water treatment applications. This invention thus entails the modified membranes, methods of making the modified membranes, and their use in water treatment.

An embodiment of the invention includes a method wherein a nanofiltration membrane is contacted with a solution of graphene oxide quantum dots to facilitate attachment of the graphene oxide quantum dots to an outer surface of the nanofiltration membrane.

In one embodiment, the membrane herein includes an interfacially formed polyamide layer residing upon a microporous support film and having a plurality of graphene oxide quantum dots attached to an outer surface of the polyamide layer. The polyamide layer has a permeate flux and a salt rejection performance. The permeate flux is increased by the presence of the graphene oxide quantum dots attached to the outer surface of the polyamide.

In another embodiment, a method of making the membrane herein includes impregnating a microporous plastic support film with an aqueous solution of a polyamine, contacting the aqueous solution with a hydrocarbon solution of a polyacyl halide, forming a polyamide discriminating layer on the surface of the microporous support film, contacting the polyamide discriminating layer with a solution of a graphene oxide quantum dots, and attaching a plurality of graphene oxide quantum dots to an outer surface of the polyamide discriminating layer. The above steps generate an improved water treatment membrane having an increase in membrane flux.

In yet another embodiment, a method of treating a feed water with a nanofiltration membrane includes the nanofiltration membrane having a coating comprising a plurality of graphene oxide quantum dots.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING

The disclosure will be better understood and objects other than those set forth above will become apparent when consideration is given to the following detailed description thereof. Such description makes reference to the annexed drawing wherein:

FIG. 1 is a schematic drawing of a cross-section of a portion of a composite membrane according to an embodiment of the disclosure.

DETAILED DESCRIPTION OF THE INVENTION

With reference now to the drawing, and in particular to FIG. 1, a new water treatment membrane devices embodying the principles and concepts of an embodiment of the disclosure and generally designated by the reference numeral 10 will be described.

As best illustrated in FIG. 1, the water treatment membrane and method of making water treatment membranes 10 generally comprises thin-film composite membranes that are useful for treating water sources wherein part or all of dissolved salts in the water sources are removed. Applications include seawater desalination and brackish water renovation, as well as purification of water for industrial purposes. In actuality, the salts are not removed. The membranes essentially split an incoming feed stream into two exit streams, one of which is purified water and the other a concentrate stream. These membranes are generally categorized into two types: reverse osmosis membranes that are designed to remove all salts to the greatest degree possible, and nanofiltration membranes that are designed to let some salts pass preferentially while rejecting others.

Modern reverse osmosis and nanofiltration membranes are nearly all made at this time by generating an ultrathin polyamide discriminating layer on the surface of a microporous plastic support film. This is done by a process of interfacial polymerization of a polyamine with a polyacyl halide. The polyamine is contained in an aqueous solution which is impregnated into the top surface of the microporous plastic layer. The polyacyl halide is contained in a hydrocarbon solution that is applied as a liquid coating to the amine-impregnated microporous support layer. Polyamide formation occurs at the interface between the aqueous phase and the hydrocarbon phase. The microporous support layer is commonly supported by a nonwoven carrier web for strength and handling. Membranes made by this process consist of an ultrathin salt-rejecting (discriminating) layer resting on a microporous plastic layer bonded to a nonwoven fabric carrier layer, the whole being referred to as a composite membrane.

In membranes intended for reverse osmosis desalination of seawater or reclamation and purification of brackish water, producing potable water from such feed waters, the polyamide discriminating layer is generally composed of a reaction product of an aromatic polyamine with an aromatic polyacyl halide. In particular, the polyamine is preferably metaphenylenediamine (benzene-1,3-diamine), although substitution of benzene-1,3,5-triamine for some or all of the metaphenylenediamine may be practiced. The polyacyl halide is commonly trimesoyl chloride (benzene-1,3,5-tricarbonyl chloride) or its blend with isophthaloyl chloride (benzene-1,3-dicarbonyl chloride). Other polyamines and polyacyl halides have been substituted for some or all of these chemical building blocks at times, one example being an aliphatic polyamine—polyethylenimine—which is rich in primary, secondary, and tertiary amine groups. But the reverse osmosis industry has settled almost exclusively on aromatic polyamine and aromatic polyacyl halide chemical ingredients. In nanofiltration membranes the aromatic polyamine is usually replaced with piperazine, which leads to a composite membrane that rejects divalent salts such as calcium sulfate and magnesium sulfate while permeating monovalent salts, particularly sodium chloride. By way of example, nanofiltration of seawater can be used to generate a permeate stream of purified aqueous sodium chloride and a concentrate stream containing the larger salts present in the seawater such as sulfates. For purposes of this invention, both reverse osmosis and nanofiltration membranes made by interfacial polymerization of the discriminating layer are suitable for surface modification by graphene oxide quantum dots.

A generalized procedure that may be utilized for making reverse osmosis and nanofiltration membranes suitable as a base for attachment of graphene oxide quantum dots is presented as follows. For a nanofiltration membrane, a microporous membrane support is coated with aqueous amine solution containing piperazine or its blend with polyethylenimine at about 0.1 to 5 weight percent, preferably about 0.5 to 1.5 wt %, accompanied by a salt of camphorsulfonic acid at a concentration of about 0.5 to 6 wt %, preferably about 2 to 4 wt %. For reverse osmosis membrane, the amine solution contains meta-phenylenediamine at about 1 to 6 weight percent, preferably about 2 to 5 wt %, accompanied by a salt of camphorsulfonic acid at a concentration of about 1 to 8 wt %, preferably about 2 to 5 wt %. Acid acceptor such as sodium hydroxide should be included to maintain aqueous amine solution pH in the range of 8-13, preferably 10-12.5. Small amounts of various organic solvents and/or additives may also be included in the aqueous amine solution for their beneficial effect on the interfacial formation of the membrane's discriminating layer. Some such additives include surfactants, amine salts, isopropyl alcohol, dimethyl sulfoxide and dimethylformamide.

The amine-laden coated microporous support is then contacted with a monomeric polyfunctional acyl halide or a blend of acyl halides, preferably in a non-polar organic solvent or mixed non-polar organic solvents, although the polyfunctional acyl halide may be delivered from a vapor phase (for polyacyl halides having sufficient vapor pressure). The polyfunctional acyl halides are preferably aromatic in nature and contain at least two and preferably three acyl halide groups per molecule. Because of their lower cost and greater availability, acyl chlorides are generally preferred over the corresponding acyl bromides or iodides. One particularly preferred polyfunctional acyl halide is trimesoyl chloride. The polyfunctional acyl halide is typically dissolved in a non-polar organic solvent in a range of 0.05 to 3 weight percent, preferably 0.1 to 0.3 weight percent. Suitable non-polar organic solvents are those which are capable of dissolving polyfunctional acyl halides and which are immiscible with water. Preferred solvents do not pose a threat to the ozone layer and are sufficiently safe in terms of their flashpoints and flammability to undergo routine processing without having to undertake extreme precautions. Higher boiling hydrocarbons, i.e., those with boiling points greater than about 90° C. such as C8-C14 hydrocarbons and mixtures thereof are favored.

Once brought into contact with the aqueous polyamine solution coated on the microporous support, the polyfunctional acyl halide reacts with the polyamine at the water-solvent interface to form a crosslinked polyamide discriminating layer. The reaction time typically occurs within a few seconds but contact time is often from ten to sixty seconds to allow full development of a polyamide layer thickness, after which excess liquid is customarily removed, e.g., by way of an air knife, and/or a dryer. The removal of the excess organic solvent is most conveniently achieved by drying at elevated temperatures, e.g., from about 60° C. to about 120° C. for about 1.5 to 15 minutes, preferably 2 to 5 minutes, in circulating air oven or dryer, although air drying at ambient temperatures may be used. For purposes of this invention, treatment of the interfacially formed membrane with amine-modified graphene oxide quantum dots is performed before washing step (if rinse is required to remove reactive residual chemicals from the membrane).

Preparation of functionalized graphene oxide quantum dots: Graphitic oxide particles historically were made by oxidation of graphite or of graphene, as it is currently referred to. The preparation was energy intensive and graphite was relatively expensive. Yields were low and the resulting graphene oxide particles were nonuniform in shape and size. The picture changed greatly in the present decade, starting with the discovery and characterization of graphene oxide quantum dots and its progression from there to recipes and techniques for generating graphene oxide particles by assembling reactions of simple chemical building blocks, referred to as a "bottoms up" approach to making carbon quantum particles or dots. For purposes of this invention, amine-containing graphene oxide quantum dots appear to be very suitable to the application and may be prepared by thermolysis of ammoniated citric acid. To this end a solution containing 8% citric acid and 6% ammonia in water was autoclaved at 180 degrees Celsius for 24 hours. The resulting yellow aqueous dispersion was treated with hydrochloric acid to neutralize ammonia, and then dialyzed against water using a 2000 Da cutoff dialysis bag to remove low molecular weight species. The preparation was then centrifuged to remove large particles. The clear solution that remained was available to be diluted to target concentrations for membrane coating applications. Sonication of the solution for 30 minutes before use in membrane surface treatments was practiced. In the publication by Fathizadeh et alia, these graphene oxide quantum dots were found to be primarily monolayer sheets of graphitic compositions but with some dots having a multiple of such layers (up to five layers).

Preparation of modified membrane: The aqueous solution containing graphene oxide quantum dots was coated onto the surface of a polyamide discriminating layer. In the following examples, attachment was made via chemical reaction with residual acyl halide groups on the polyamide membrane surface. A residual population of these acyl halide groups typically remains active on the membrane surface after conclusion of the interfacial polymerization that forms a polyamide discriminating layer. These residual groups present a multiplicity of sites for attachment of amine-derivatized graphene oxide quantum dots. The contact time may be varied from as little as 10 seconds to as long as 2 minutes or greater, but it is preferably in the range from 20 to 60 seconds, to ensure secure and permanent attachment. The coated membrane was then dried in a circulating oven at 70° C. to 90° C. for between 2 to 5 minutes.

General membrane testing procedure: Water flux and salt rejection of the membrane samples were measured using a crossflow test unit equipped with flow and temperature controls. Membrane samples (about three inches in diameter) were mounted in test cells and were conditioned by flow of a feed water at an elevated test pressure for one hour at a feed flow rate of 0.9 to 1.1 gallons per minute, feed temperature of 25° C. and feed pH 7-8. Readings were then taken of permeate flow per unit of time calculated in terms of gallons per square foot of membrane per day (expressed as gfd). Permeate conductivity was measured and compared with feed conductivity to determine membrane salt rejection according to the following equation:

$$\text{Rejection} = (1 - C_p/C_f) \times 100\%$$

where $C_p$ and $C_f$ are salt concentrations in permeate flow and feed flow respectively.

The following examples are provided to illustrate the invention and should not be construed to limit the scope of the appended claims. In these examples, an aqueous solution containing amino-functionalized graphene oxide quantum dots was coated on the surface of a nanofiltration or reverse osmosis membrane consisting of an interfacially formed polyamide layer residing upon a macroporous support film. The coated membrane was dried, and then compared with the base membrane (i.e. an uncoated membrane from the same lot).

FIG. 1 is a schematic drawing of a cross-section of a portion of a composite membrane modified with graphene oxide quantum dots. The quantum dots 1 are attached to the top surface of a polyamide discriminating layer 2, which is in turn in communication with the top surface of a microporous plastic layer 5. The quantum dots are estimated to be about two nanometers thick, and interfacially formed polyamide membrane layers are generally about 200 nanometers thick. The FIGURE shows a rough approximation of the thickness difference between the quantum dots 1 and the polyamide discriminating layer 2. Where the polyamide surface is coated, flux through the membrane is enhanced, as depicted by the elongated arrow 4. If the surface were not coated, as depicted for instance by a patch of uncoated surface 6, permeation through the polyamide corresponding to absence of the coating is depicted by the shorter arrow 3. At this time, it is uncertain why such a thin coating of quantum dots 1 should have such an effect on the flux through the whole thickness of the polyamide layer 2. Regarding maintenance of salt rejection, it may be seen from FIG. 1 that all permeate must still penetrate through a complete thickness of the polyamide discriminating layer 2, which ensures the quality of the permeate.

Example 1

In this example, a solution containing amine-functionalized graphene oxide quantum dots at the concentration of 0.6% along with camphorsulfonic acid and sodium hydroxide was coated on a nanofiltration membrane comprised of an interfacial reaction product of piperazine with trimesoyl chloride. The feed solution was 0.2% magnesium sulfate solution in water. Test pressure was 70 psig. The uncoated nanofiltration membrane exhibited a flux of 39 gfd and a magnesium sulfate rejection of 98.8%. The coated membrane exhibited a flux of 62.3 gfd and a magnesium sulfate rejection of 97.0%. In this example, the graphene oxide carbon dot application increased membrane flux by 56%.

Example 2

In this example, graphene oxide quantum dots at the concentration of 0.6% along with sodium camphorsulfonate oxide was coated on a nanofiltration membrane comprised of an interfacial reaction product of a piperazine/polyethylenimine with trimesoyl chloride. The feed solution was 0.2% magnesium sulfate solution and test pressure was 70 psig. The uncoated nanofiltration membrane exhibited a flux of 46.9 gfd and a magnesium sulfate rejection of 98.3%. The coated membrane exhibited a flux of 55.6 gfd and a magnesium sulfate rejection of 97.5%. In this example, the graphene oxide carbon dot application increased by membrane flux by 18%.

Examples 3-5

In these examples, the base or reference membrane was prepared by impregnating a microporous polysulfone support with a 0.5% solution of piperazine containing also sodium camphorsulfonate and interfacially reacting the piperazine with trimesoyl chloride contained at a concentration of 0.18% in a hydrocarbon solution. Portions of this reference membrane were coated with amine-functionalized graphene oxide quantum dots at varying lengths of time, the graphene oxide quantum dots being at a concentration of 0.6% and accompanied by sodium camphorsulfonate in the coating solution. Coating times were 20 seconds (example 3), 30 seconds (example 4) and 50 seconds (example 5). Results are displayed in Table 1.

TABLE 1

| Membrane | Coating Time | Flux (gfd) | Flux Increase | Salt Rejection |
|---|---|---|---|---|
| Reference | 0 | 47.5 | n/a | 97.3% |
| Example 3 | 20 sec | 58.7 | 23.6% | 96.6% |
| Example 4 | 30 sec | 63.1 | 32.8% | 95.2% |
| Example 5 | 50 sec | 71.5 | 50.5% | 94.5% |

These results show that increasing contact time of the graphene oxide quantum dots with the surface of the nanofiltration membrane results in major increases in membrane flux, accompanied by a minor downtrend in salt rejection.

Examples 6-7

In these examples, the base or reference membrane was prepared by impregnating a microporous polysulfone support with a 0.5% solution of piperazine containing also sodium camphorsulfonate and interfacially reacting the piperazine with trimesoyl chloride contained at a concentration of 0.18% in a hydrocarbon solution. A portion of this reference membrane was coated with amine-functionalized graphene oxide quantum dots at a carbon dot concentration of 0.6% for an exposure time of 20 seconds to generate example 6. Example 7 employed a carbon dot solution of 0.34% and 20 seconds exposure time. Both carbon dot solutions contained sodium camphorsulfonate at pH 12. Results are displayed in Table 2. A higher flux was observed in this example at a lower coating concentration.

TABLE 2

| Membrane | Flux (gfd) | Flux Increase | Salt Rejection |
|---|---|---|---|
| Reference | 48.7 | n/a | 97.3% |
| Example 6 | 64.4 | 32% | 95.1% |
| Example 7 | 81.1 | 67% | 91.5% |

Examples 8-9

Nanofiltration membrane was made following the same interfacial reaction conditions used in making examples 6 and 7, and portions were used in making examples 8 and 9. Example 8 was coated with a solution containing 0.34% of the graphene oxide quantum dots, 0.11% polyethylenimine (MW 1300), and sodium camphorsulfonate. For example 9, the coating solution contained 0.17% of the graphene oxide quantum dots, 0.06% of the polyethylenimine, and sodium camphorsulfonate. Coating time in both instances was 20 seconds. Results are displayed in Table 3. Both examples showed significant flux increases.

TABLE 3

| Membrane | Flux (gfd) | Flux Increase | Salt Rejection |
|---|---|---|---|
| Reference | 48.0 | n/a | 97.6% |
| Example 8 | 68.5 | 42.8% | 93.7% |
| Example 9 | 68.0 | 41.7% | 94.4% |

Examples 10-11

The behavior of membranes containing surface-coated graphene oxide quantum dots was investigated as regards their resistance or lack thereof toward biofouling. It is known that an aqueous solution of approximately 5% lactose and 3.5% protein generates a variety of microorganisms including species of *Pseudomonas*, micrococci, bacilli, lactobacilli, staphylococci, coliforms, and the like. Such a solution was prepared, and the topsides of membrane samples were kept in direct contact with the solution at room temperature for a period of at least 160 hours of incubation. After development of biofouling in this manner, membrane samples were soaked in water, and then gently rinsed to remove chunks of deposits from the surfaces. Membrane flux and salt rejection data were recorded for membranes prior to fouling and after fouling. Table 4 displays fouling data for two nanofiltration membranes, these being example 10 modified by a coating treatment with a 0.1% carbon dot solution and example 11 modified by a 1.0% carbon dot solution. These were evaluated in a side by side test along with an uncoated sample for reference. Testing was with 0.2% magnesium sulfate solution at 70 psig feed pressure. The data show that the graphene oxide quantum dots do not exacerbate biofouling and may even provide some resistance to biofouling by the treated membranes.

TABLE 4

| Sample | Coating Concentration | Initial Flux | Fouled Flux | Flux Change |
|---|---|---|---|---|
| Reference | n/a | 39.7 gfd | 34.8 gfd | −12.2% |
| Example 10 | 0.1% | 44.4 gfd | 41.0 gfd | −7.6% |
| Example 11 | 1.0% | 48.7 gfd | 49.2 gfd | +1.0% |

Examples 12-13

A reverse osmosis membrane was made according to the general procedure given for making nanofiltration membranes. But in this case, metaphenylenediamine was used instead of piperazine. The resulting aromatic polyamide membrane, i.e. the interfacial reaction product of metaphenylenediamine with trimesoyl chloride, is capable of high rejection of sodium chloride and has utility in brackish water and seawater desalination. Portions of this membrane were treated with graphene oxide quantum dots. Example 12 was coated with a solution of 0.5% graphene oxide quantum dots, the solution also containing sodium camphorsulfonate. Example 13 was coated similarly but with a solution containing 1.0% graphene oxide quantum dots. These coated membrane samples and an uncoated reference sample were evaluated for biofouling resistance in terms of flux loss due to biofouling. As in the procedure with examples 10 and 11, the membrane samples were incubated with a biofouling preparation of lactose and protein. A side-by-side test was conducted using a feed water of 0.2% sodium chloride and a test pressure of 225 psig. Results are displayed in Table 5. The data show a modest improvement in fouling resistance due to presence of the surface coating of the graphene oxide quantum dots. Salt rejection was basically unaffected.

TABLE 5

| Membrane | Initial Flux | Fouled Flux | Flux Loss | Salt Rejection |
|---|---|---|---|---|
| Reference | 46.7 gfd | 32.7 gfd | −30.0% | 99.64% |
| Example 12 | 47.4 gfd | 36.0 gfd | −24.0% | 99.70% |
| Example 13 | 47.8 gfd | 37.3 gfd | −22.0% | 99.65% |

The examples and test data demonstrated that the incorporation of functionalized graphene oxide quantum dots permanently as a top coating on the top of thin film composite membrane via secondary interfacial reaction is an effective approach to prepare high performance, and especially high flux low energy, membranes for water treatment applications. Other potential benefits include improved fouling resistance and chemical resistance etc. And although the invention has been described in considerable details, many variations and modifications can be made on the invention as described above without departing from the theme and scope of the invention as it is described in the appended claims.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawing and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A method of making a water treatment membrane comprising:
   a) impregnating a microporous plastic support film with an aqueous solution of a polyamine;
   b) contacting the aqueous solution with a hydrocarbon solution of a polyacyl halide;
   c) forming a polyamide discriminating layer on the surface of the microporous support film;
   d) contacting the polyamide discriminating layer with a solution of a graphene oxide quantum dots such that a plurality of the graphene oxide quantum dots attaches to an outer surface of the polyamide discriminating layer, wherein a water treatment membrane is generated facilitating an increase in membrane flux, wherein the solution of graphene oxide quantum dots also contains a sodium salt of camphorsulfonic acid.

2. The method of claim 1, wherein the solution of graphene oxide quantum dots is at a concentration in a range from 0.05% to 1.0%.

3. The method of claim 1, wherein the polyamide discriminating layer contains acyl halide groups on its outer surface.

4. A method of making a water treatment membrane comprising,
   contacting a nanofiltration membrane with a solution of graphene oxide quantum dots to facilitate attachment of the graphene oxide quantum dots to an outer surface of the nanofiltration membrane;
   wherein the nanofiltration membrane comprises an interfacially formed polyamide discriminating layer residing on a microporous support film; and
   wherein the outer surface of the membrane is contacted with a solution comprising graphene oxide quantum dots and a salt of camphorsulfonic acid.

* * * * *